(12) United States Patent
Ash et al.

(10) Patent No.: US 9,976,726 B2
(45) Date of Patent: May 22, 2018

(54) DUST COVER ASSEMBLY WITH EDGE LIGHT

(71) Applicant: Gentex Corporation, Zeeland, MI (US)

(72) Inventors: Kevin L. Ash, Grand Rapids, MI (US); Steven J. Veenman, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 373 days.

(21) Appl. No.: 14/729,555

(22) Filed: Jun. 3, 2015

(65) Prior Publication Data

US 2015/0354790 A1    Dec. 10, 2015

Related U.S. Application Data

(60) Provisional application No. 62/008,144, filed on Jun. 5, 2014, provisional application No. 62/032,010, filed on Aug. 1, 2014.

(51) Int. Cl.
*F21V 14/08* (2006.01)
*B64D 47/02* (2006.01)
(Continued)

(52) U.S. Cl.
CPC ............ *F21V 14/08* (2013.01); *B64C 1/1492* (2013.01); *B64D 47/02* (2013.01); *F21V 11/00* (2013.01)

(58) Field of Classification Search
CPC ...... B64C 1/1492; G02B 27/0006; G02F 1/15
(Continued)

(56) References Cited

U.S. PATENT DOCUMENTS 4,542,611 A * 9/1985 Day .................. E06B 3/677
52/172
4,640,583 A  2/1987 Hoshikawa et al.
(Continued)

FOREIGN PATENT DOCUMENTS

EP    0947874 A2    10/1999
EP    0947875 A2    10/1999
(Continued)

OTHER PUBLICATIONS

European Patent Office, European Search Report dated Apr. 25, 2017 for European Application No. EP 15803977.6, 8 pages.
(Continued)

*Primary Examiner* — Seung C Sohn
(74) *Attorney, Agent, or Firm* — Price Heneveld LLP; Bradley D. Johnson (57) ABSTRACT

A window assembly includes a pressure pane and a bezel proximate a periphery of the pressure pane and defining an inner opening. The bezel includes an inner wall with a channel. An electro-optic element is disposed in the inner opening and is received in the channel of the inner wall. The electro-optic element operates between a transmissive condition and a dimmed condition. A surface of the electro-optic element exhibits a first level of spectral reflectivity at least when in the dimmed condition. The assembly further includes a dust cover assembly proximate the bezel. The dust cover assembly including a light transmitting sheet and a plurality of light sources disposed at edges of the light transmitting sheet and to emit light into the light transmitting sheet to illuminate the light transmitting sheet with a diffuse light.

20 Claims, 3 Drawing Sheets

(51) Int. Cl.
*F21V 11/00* (2015.01)
*B64C 1/14* (2006.01)

(58) Field of Classification Search
USPC ...................................... 250/214 AL, 214 D
See application file for complete search history.

(56) References Cited

U.S. PATENT DOCUMENTS

| | | | |
|---|---|---|---|
| 4,646,158 | A | 2/1987 | Ohno et al. |
| 4,702,566 | A | 10/1987 | Tukude |
| 4,893,908 | A | 1/1990 | Wolf et al. |
| 4,917,477 | A | 4/1990 | Bechtel et al. |
| 5,004,961 | A | 4/1991 | Berner et al. |
| 5,007,217 | A | 4/1991 | Glover et al. |
| 5,066,111 | A | 11/1991 | Singleton et al. |
| 5,092,939 | A | 3/1992 | Nath et al. |
| 5,124,832 | A | 6/1992 | Greenberg et al. |
| 5,136,419 | A | 8/1992 | Shabrang |
| 5,161,048 | A | 11/1992 | Rukavina |
| 5,202,787 | A | 4/1993 | Byker et al. |
| 5,228,925 | A | 7/1993 | Nath et al. |
| 5,384,578 | A | 1/1995 | Lynam et al. |
| 5,384,653 | A | 1/1995 | Benson et al. |
| 5,612,847 | A | 3/1997 | Malecke et al. |
| 5,654,736 | A | 8/1997 | Green et al. |
| 5,657,149 | A | 8/1997 | Buffat et al. |
| 5,724,176 | A | 3/1998 | Nishikitani et al. |
| 5,724,187 | A | 3/1998 | Varaprasad et al. |
| 5,725,809 | A | 3/1998 | Varaprasad et al. |
| 5,805,330 | A | 9/1998 | Byker et al. |
| 5,838,483 | A | 11/1998 | Teowee et al. |
| 5,889,608 | A | 3/1999 | Buffat et al. |
| 5,983,593 | A | 11/1999 | Carbary et al. |
| 5,995,273 | A | 11/1999 | Chandrasekhar |
| 6,020,989 | A | 2/2000 | Watanabe |
| 6,045,724 | A | 4/2000 | Varaprasad et al. |
| 6,055,089 | A | 4/2000 | Schulz et al. |
| 6,056,410 | A | 5/2000 | Hoekstra et al. |
| 6,084,702 | A | 7/2000 | Byker et al. |
| 6,166,496 | A | 12/2000 | Lys et al. |
| 6,207,083 | B1 | 3/2001 | Varaprasad et al. |
| 6,210,008 | B1 | 4/2001 | Hoekstra et al. |
| 6,245,262 | B1 | 6/2001 | Varaprasad et al. |
| 6,254,003 | B1 | 7/2001 | Pettinelli et al. |
| 6,407,847 | B1 | 6/2002 | Poll et al. |
| 6,471,360 | B2 | 10/2002 | Rukavina et al. |
| 6,471,362 | B1 | 10/2002 | Carter et al. |
| 6,567,708 | B1 | 5/2003 | Bechtel et al. |
| 6,897,936 | B1 | 5/2005 | Li et al. |
| 6,906,632 | B2 | 6/2005 | DeLine et al. |
| 6,924,919 | B2 | 8/2005 | Hunia et al. |
| 7,064,882 | B2 | 6/2006 | Tonar et al. |
| 7,130,101 | B2 | 10/2006 | Rukavina et al. |
| 7,167,294 | B2 | 1/2007 | Lynam et al. |
| 7,324,261 | B2 | 1/2008 | Tonar et al. |
| 7,535,614 | B1 | 5/2009 | Tapley et al. |
| 7,537,361 | B2 | 5/2009 | Jugovic |
| 7,990,603 | B2 | 8/2011 | Ash et al. |
| 8,064,120 | B2 | 11/2011 | Callahan |
| 8,105,645 | B2 | 1/2012 | Bruce et al. |
| 8,154,788 | B2 | 4/2012 | Millett et al. |
| 8,201,800 | B2 | 6/2012 | Filipiak |
| 8,210,695 | B2 | 7/2012 | Roth et al. |
| 8,313,817 | B2 | 11/2012 | Bruce et al. |
| 8,827,517 | B2 | 9/2014 | Cammenga et al. |
| 9,403,590 | B2 * | 8/2016 | Driscoll ................ B64C 1/1492 |
| 9,586,669 | B2 * | 3/2017 | Ash ........................ B64C 1/1492 |
| 2004/0160660 | A1 | 8/2004 | Malvino |
| 2005/0063036 | A1 | 3/2005 | Bechtel et al. |
| 2005/0156753 | A1 | 7/2005 | DeLine et al. |
| 2005/0200935 | A1 | 9/2005 | Liu et al. |
| 2006/0032980 | A1 | 2/2006 | Jugovic et al. |
| 2008/0049295 | A1 | 2/2008 | Tonar et al. |
| 2008/0230653 | A1 | 9/2008 | Mitchell |
| 2012/0217346 | A1 | 8/2012 | Eberle et al. |
| 2012/0218655 | A1 | 8/2012 | Steel et al. |
| 2012/0268961 | A1 | 10/2012 | Cammenga et al. |
| 2012/0273738 | A1 | 11/2012 | Sybert et al. |
| 2012/0320588 | A1 * | 12/2012 | Quilici .................... F21S 8/026 362/249.02 |
| 2012/0327234 | A1 | 12/2012 | Fish, Jr. et al. |
| 2013/0055951 | A1 | 3/2013 | Bruce et al. |
| 2013/0057937 | A1 | 3/2013 | Berman et al. |
| 2013/0062497 | A1 | 3/2013 | Vanhuis et al. |
| 2013/0157493 | A1 | 6/2013 | Brown |
| 2013/0161971 | A1 | 6/2013 | Bungo et al. |
| 2014/0063630 | A1 | 3/2014 | Busscher et al. |
| 2014/0091123 | A1 | 4/2014 | Kim et al. |
| 2014/0097320 | A1 | 4/2014 | Rizk et al. |
| 2014/0140080 | A1 | 5/2014 | Mohat |

FOREIGN PATENT DOCUMENTS

| | | |
|---|---|---|
| EP | 0947876 A2 | 10/1999 |
| WO | 98/57228 | 12/1998 |
| WO | 2003/011688 | 2/2003 |
| WO | 2013013662 A1 | 1/2013 |
| WO | 2013153216 A1 | 10/2013 |

OTHER PUBLICATIONS

International Search Report and Written Opinion of the International Searching Authority dated Oct. 8, 2015 for International Application No. PCT/US2015/033993, filed Jun. 3, 2015.
R. Sullivan et al., "Effect of Switching Control Strategies on the Energy Performance of Electrochromic Windows," SPIE, vol. 2255, 14 pages, (Feb. 1994).
A.W. Czanderna et al., "Durability Issues and Service Lifetime Prediction of Electrochromic Windows for Buildings Applications," Solar Energy Materials & Solar Cells, 56 (1999), 18 pages.
Patent Cooperation Treaty Communication, dated Dec. 21, 2007, 13 pages.
Communication from the European Patent Office, Supplementary European Search Report, dated Aug. 8, 2010, (9 pages).
Patent Cooperation Treaty, International Searching Authority, International Search Report and Written Opinion of the International Searching Authority and Notification of Transmittal, Nov. 13, 2014, 8 pages.
Dr. John Straube, P. Eng., University of Waterloo, The Future of Window Technology . . . Is Here! Journal of Building Enclosure Design, http://www.buildingscience.com/documents/published-articles/pa-future-window-technology, 2010, 3 pages.
Citizens League for Environmental Action Now, Clean Living, http://www.cleanhouston.org/living/ green_building/construction/windows.htm, 2004. 3 pages.

* cited by examiner

DUST COVER ASSEMBLY WITH EDGE LIGHT

CROSS-REFERENCE TO RELATED APPLICATIONS

This application claims the benefit of U.S. Provisional Patent Application Nos. 62/008,144, filed on Jun. 5, 2014, entitled "DUST COVER ASSEMBLY WITH EDGE LIGHT," and 62/032,010, filed on Aug. 1, 2014, entitled "DUST COVER ASSEMBLY WITH EDGE LIGHT", the disclosures of which are hereby incorporated herein by reference in their entirety.

BACKGROUND OF THE INVENTION

The present invention generally relates to a window assembly, and more specifically, to a window assembly that includes a dust cover assembly that emits a diffuse light.

Various electrochromic or electro-optic windows have been developed to allow a dimming, or darkening feature to be realized in a window assembly. Such dimming or darkening can adjust the level of transparency of a window from fully-transparent to fully-opaque (or darkened). Because such windows use spectrally reflective materials and darken to a gray or black color, reflections in the windows may become visible or more perceptible to an observer when such windows are in a darkened or opaque state. Accordingly, further advances may be desired to limit or reduce the amount of spectral reflectivity in electrochromic or electro-optic windows.

SUMMARY OF THE PRESENT INVENTION

One aspect of the present invention includes a window assembly including a pressure pane and a bezel proximate a periphery of the pressure pane and defining an inner opening. The bezel includes an inner wall with a channel. An electro-optic element is disposed in the inner opening and is received in the channel of the inner wall. The electro-optic element operates between a transmissive condition and a dimmed condition. A surface of the electro-optic element exhibits a first level of spectral reflectivity at least when in the dimmed condition. The assembly further includes a dust cover assembly proximate the bezel. The dust cover assembly including a light transmitting sheet and a plurality of light sources disposed at edges of the light transmitting sheet and to emit light into the light transmitting sheet to illuminate the light transmitting sheet with a diffuse light.

Another aspect of the present invention includes a window assembly having an electro-optic element operating between a transmissive condition and a dimmed condition and a dust cover assembly proximate the electro-optic element. The dust cover assembly includes a light transmitting sheet and a plurality of light sources disposed at edges of the light transmitting sheet to emit light into the light transmitting sheet to illuminate the light transmitting sheet according to one of: a predetermined color, a predetermined intensity, and a predetermined color and intensity. The window assembly further includes a control system coupled with the light sources of the dust cover assembly to control the illumination of the light transmitting sheet.

Another aspect of the present invention includes a method for controlling a level of spectral reflectivity exhibited by a window assembly. The method includes determining a perceivable level of ambient light reflected by a surface of an electro-optic element within the window assembly and illuminating a plurality of light sources disposed at edges of a light transmitting sheet adjacent the electro-optic element to cause the light sources to emit light into the light transmitting sheet. Such illumination is carried so as to illuminate the light transmitting sheet with a diffuse light at a level greater than the perceivable level of ambient light reflected from the surface of the electro-optic element.

These and other aspects, objects, and features of the present invention will be understood and appreciated by those skilled in the art upon studying the following specification, claims, and appended drawings. It will also be understood that features of each embodiment disclosed herein may be used in conjunction with, or as a replacement for, features of the other embodiments.

DETAILED DESCRIPTION OF EMBODIMENTS

Figure 1:
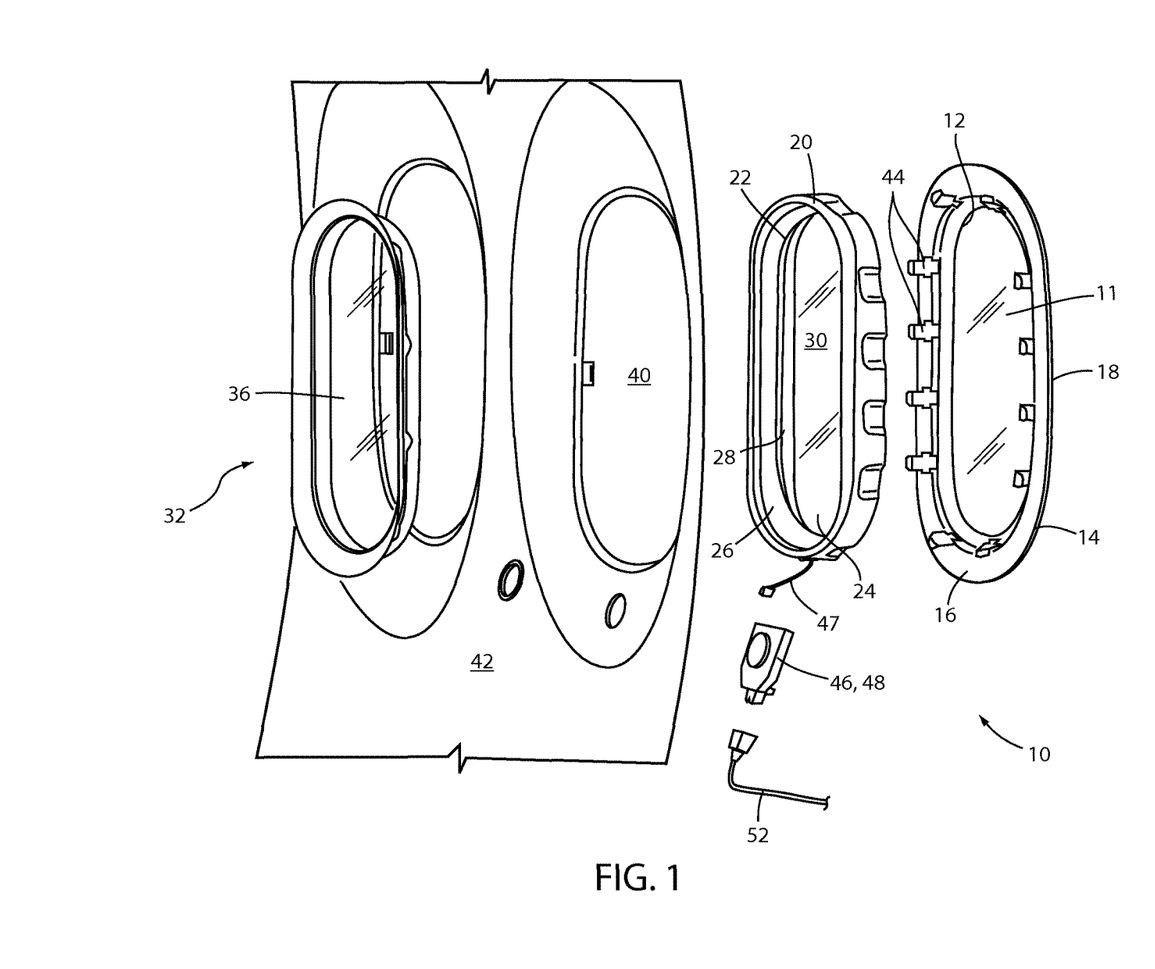
FIG. 1 is an exploded side perspective view of one embodiment of an aerospace protective dust cover assembly of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
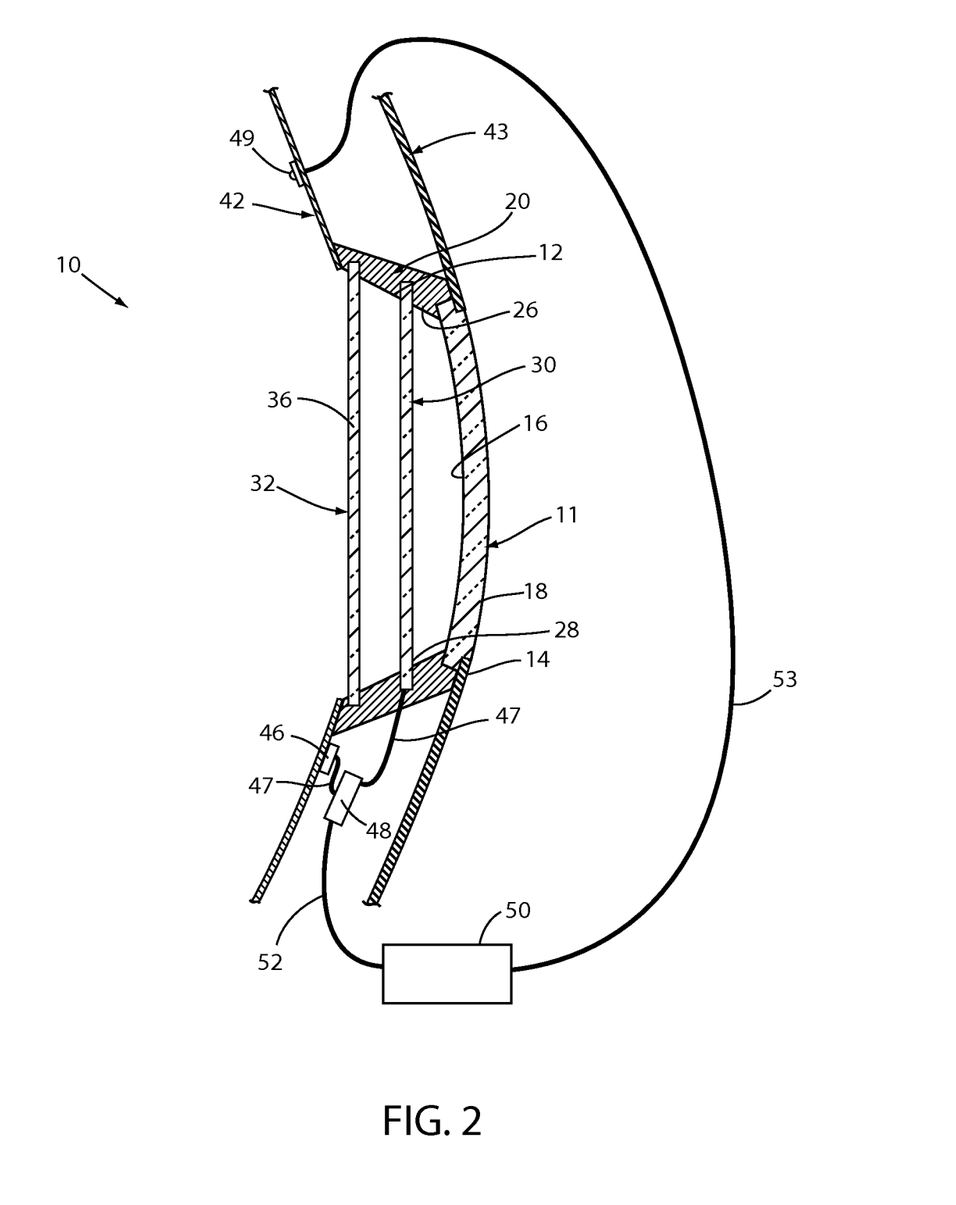
FIG. 2 is a side partial cross-sectional view of an aerospace protective dust cover assembly.

Referring to FIGS. 1 and 2, reference numeral 10 generally designates an aircraft window assembly having a pressure pane 11 in abutting contact with an inner surface 12 of an exterior pressure pane frame 14. The pressure pane 11 includes an interior surface 16 and an exterior surface 18. A bezel 20 is disposed proximate a periphery 22 of the pressure pane 11 and defines an inner opening 24. The bezel 20 includes an inner wall 26 with a channel 28. An electro-optic element 30 is disposed in the inner opening 24 and is configured for reception in the channel 28 of the inner wall 26. The electro-optic element 30 is capable of operation between a transmissive condition and a dimmed condition, along with various intermediate conditions therebetween. A dust cover assembly 32 is disposed proximate the bezel 20. The dust cover assembly 32 includes a plurality of light sources 34 (FIG. 3) disposed at edges of a light transmitting sheet 36. The light sources 34 are configured to transmit light into the sheet 36 to illuminate the sheet 36 in a particular color and with a particular intensity. It is noted that, although the window assembly of the present disclosure is described herein with respect to an embodiment thereof that is in the form of an aircraft window assembly, additional embodiments of the window assembly may be in the form of other window assemblies, including those for automotive or other transportation-related applications, as well as for commercial and/or residential windows, both interior and exterior, among others.

With reference again to FIGS. 1 and 2, the exterior pressure pane frame 14 is generally designed to be received in an aperture 40 defined in an interior sidewall 42 and an exterior hull 43 of an aircraft. The exterior pressure pane frame 14 supports the pressure pane 11, which is generally transparent to provide a view to a passenger seated inside the aircraft. A multitude of connectors 44 may be disposed about the exterior pressure pane frame 14 to secure the exterior pressure pane frame 14 to the sidewall 42 of the aircraft. The bezel 20 is generally positioned in abutting contact or close proximity to the exterior pressure pane frame 14. The bezel 20 may be of a foam construction with high flexibility and resiliency, but may also include a rigid construction. The illustrated bezel 20 closely receives the electro-optic element 30. The electro-optic element 30 is configured to extend into a channel 28 disposed in the inner wall 26 of the bezel 20. The dust cover assembly 32 is positioned inward of the bezel 20 and the exterior pressure pane frame 14.

The electro-optic element 30 of the present disclosure may make use of or incorporate various structures or compositions such as those described in U.S. Pat. Nos. 8,925,891; 8,814,373; 8,201,800; 8,210,695; 9,174,577 and 9,838,653; and U.S. Provisional Patent Application Nos. 61/709,716; 61/707,676; and 61/704,869, which are hereby incorporated herein by reference in their entirety.

With reference again to FIG. 2, the dust cover assembly 32 is operably coupled with a passenger control interface (PCI) 46 that controls the light sources 34 adjacent the edges of the dust cover assembly 32. The PCI 46 is operably coupled via a PCI pigtail 47 with an electronic control unit 48. The electronic control unit 48 is also operably coupled with the electro-optic element 30 via an electro-optic element pigtail 47. An aircraft power and communications interface ("APCI") 50 is linked via a line 52 to the electronic control unit 48 and supplies both power and activation information to the PCI 46 and the electro-optic element 30. The APCI 50 may be controlled by aircraft personnel or by an aircraft computer. The APCI 50 can also be optionally connected with a photosensor 49 positioned within the cabin of the aircraft, such as along sidewall 42 and/or adjacent aperture 40, or in other locations. In such an example, each aperture 40 having an associated dust cover assembly 32 of the type described herein can have a respective photosensor 49 associated therewith to obtain lighting information closely associated with the particular aperture 40. Additionally or alternatively, photosensors 49 can be positioned at regular intervals throughout the aircraft so as to obtain information regarding the lighting conditions throughout the cabin. Photosensor 49 can be connected via line 53 to APCI 50 (or alternatively to an aircraft computer or the like) such that information from photosensor 49 can be received and used by APCI 50 or an aircraft computer connected therewith in determining power and activation information provided to the PCI 46 according to control schemes discussed further below.

Figure 3:
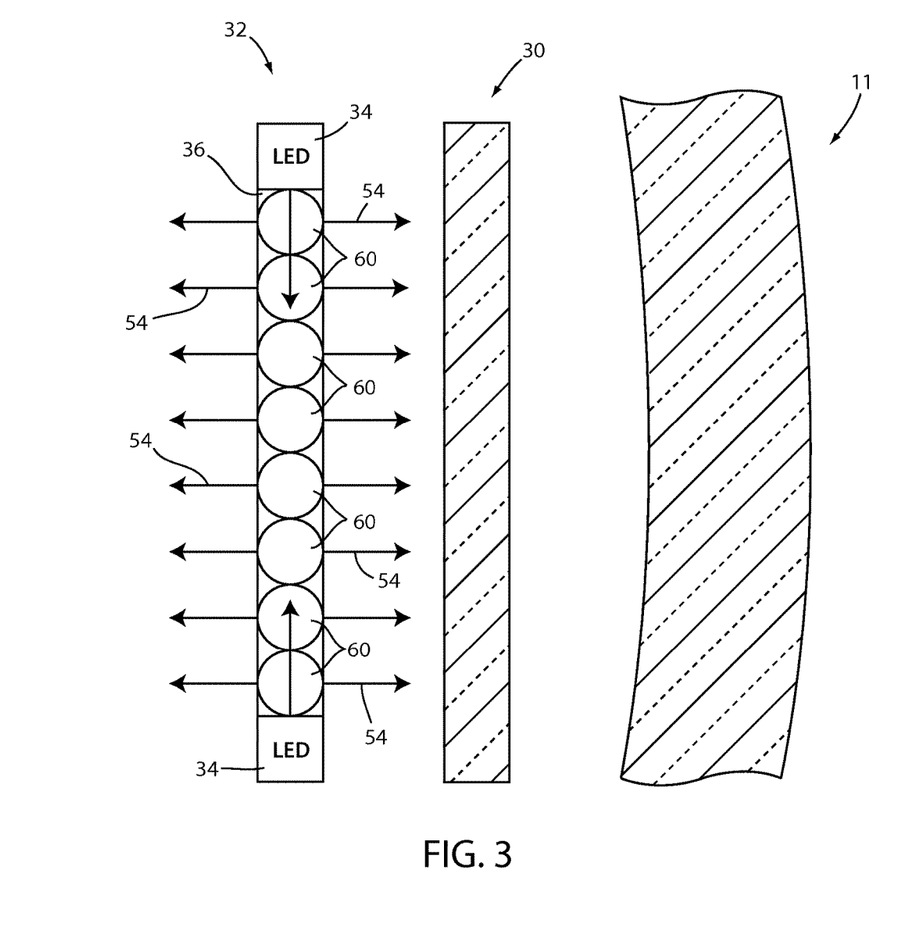
FIG. 3 is an enlarged partial cross-sectional view of an aerospace protective dust cover assembly.

With reference to the embodiment illustrated in FIG. 3, the dust cover assembly 32 is constructed from a plastic sheet configured to be edge lit by the light sources 34, such as light emitting diodes (LEDs), to produce a desired color, which can be done, for example, when the electro-optic element 30 is in a darkened state, an state between a fully-transmissive condition and a fully-darkened state, or a transmissive state when high levels of spectral reflectivity and/or glare may be present, for example. The light sources 34 may be stacked along an edge of the dust cover assembly 32, or may be spaced at a predetermined distance. Additionally, the light sources 34 may be positioned on one or more sides of the dust cover assembly 32, or even around the entire perimeter of the dust cover assembly 32. Additionally, edge reflectors can be utilized to direct light from the light source 34 back into the transmitting sheet 36. The light sources 34 are configured to emit light into the edge of the dust cover assembly 32, such that light is directed throughout the dust cover assembly 32, and also projects inwardly in the direction of arrows 54 into the interior cabin of the aircraft and also outwardly toward the electro-optic element 30.

In one embodiment, the light sources 34 can be used in connection with electro-optic element 30 to give the appearance of a generally opaque, diffuse surface. In at least some respects, such an appearance can generally match that of the sidewall 42 surrounding aperture 40, which itself typically has a non-reflective or diffusely reflective surface. Indeed, the edge lit dust cover assembly 32 is not necessarily opaque, but the light that emanates from the dust cover assembly 32 can work to overpower any appearance of a reflection in the electro-optic element 30, which can be made opaque (or can otherwise be set to a particular level of opacity). This feature can be used to counteract any "black mirror" effect that the electro-optic element 30 may exhibit in an opaque or near-opaque state, for example. More specifically, the surfaces of electro-optic element 30 may have specular reflective qualities that tend to reflect an image, rather than diffusely reflecting light. As such, as the light transmissivity of an electro-optic element 30 is reduced, a greater amount of the light that is reflected by the surface thereof is visible or perceptible to an observer, as such reflected light is less likely to be overwhelmed by ambient light passing therethrough. Since the light is reflected in a specular manner, an image becomes apparent in the form of a mirror image of the surroundings of electro-optic element 30. Some occupants of an aircraft in which dust cover assembly 32 is installed may find such specular reflectiveness irritating or unacceptable.

By contrast, when dust cover 32 is illuminated, it emanates light in a diffuse manner (as discussed further below). Accordingly, dust cover 32 can be illuminated at an intensity by which the diffuse light from dust cover 32 overpowers, and therefore reduces the appearance of, the specular reflection from electro-optic element 30. It is noted that the diffuse illumination of dust cover 32 may, in some instances, itself become at least partially opaque or otherwise give an at least partially opaque appearance. Such a result may further the blocking or overpowering of specular reflection from electro-optic element 30. As mentioned above, the amount of specular reflection observable on the surface of electro-optic element 30 can increase as the light transmissivity of electro-optic element 30 is decreased. Accordingly, the intensity of illumination of dust cover 32 can be increased in a manner that corresponds with the decreasing transmissivity of electro-optic element 30 to overpower the specular reflectance of electro-optic element 30 as it increases.

In an embodiment, the spectral reflectance exhibited by the electro-optic element 30 is in the form of a reflected image visible on the electro-optic element. Such a reflected image is visible by the electro-optic element 30 reflecting the ambient light in a spectral manner at an intensity that at least corresponds to the intensity of the ambient light itself. In one aspect, dust cover 32 can, therefore, be illuminated to a level wherein the diffuse light emitted thereby is at an intensity level greater than the intensity level of the ambient light reflected by the electro-optic element 30. In another aspect, dust cover 32 can be illuminated to a level of diffuse illumination thereof to maintain a perceivable level (such as by a human observer, for example) of specular reflectance of electro-optic element 30, as viewed through dust cover 32, below 30% R, and in another embodiment between 15% R and 5% R, and in yet another embodiment, about 10% R or less. In another example, dust cover 32 can be illuminated to a level of diffuse illumination thereof to reduce the perceivable level of specular reflectance of electro-optic element 30, as viewed through dust cover 32, to below 30% of the level exhibited by electro-optic element 30 without such illumination, and in another embodiment about 15% less, and in yet another embodiment, about 10% or less. In another embodiment, the diffuse illumination by dust cover 32 can reduce the perceived spectral reflectance of electro-optic element 30 by between about 30% and about 5%. Such reductions of specular reflectivity levels can be observable, for example, when electro-optic element 30 is in a darkened state (e.g. exhibiting a level of light transmission of, in one embodiment, less than 10%, or in another embodiment, less than 5%). In an example, APCI 50 can be configured to control the illumination of dust cover 32 at least partially based on a pre-programmed or otherwise predetermined correlation between an operating state of electro-optic element 30, including a level of darkening thereof, and an estimated resulting level of spectral reflectivity that becomes perceivable by an observer with such a level of darkening. In various examples, the amount of spectral reflectance visible on electro-optic element and the reduction provided by viewing electro-optic element 30 through a diffusely-illuminated dust cover 32 can be quantified based on comparing visible portions or features or overall image quality of an ambient image reflected by electro-optic element 30 with and without dust cover 32 in an illuminated state, although other ways of quantifying such levels may be possible.

Additionally or alternatively, the intensity of the diffuse light from dust cover 32 can be adjusted to exceed the level or intensity of light reflected in a specular manner from electro-optic element 30. For example, the intensity of illumination of dust cover 32 can be controlled (for example, by APCI 50) to be greater than the amount of ambient light either estimated or perceived to be reflected by electro-optic element 30. The amount of ambient light reflected by electro-optic element 30 can be a product of the reflectance of electro-optic element 30 in combination with a given level of light transmissivity and the level of ambient light. The level of reflectance perceivable at a various levels of light transmissivity can be determined and can be stored, for example, in an onboard computer within the aircraft (such as within or coupled with APCI 50, for example) and accessed based on a current, known, setting for electro-optic element 30 (e.g., from data obtained from electronic control unit 48). The ambient light level can be generally estimated at a baseline constant level based on known conditions within a given aircraft, estimated at a real-time level based on information regarding the lighting condition of the aircraft (such as from an onboard computer or the like), or perceived, such as by photosensor 49.

In an example, APCI 50 can be configured to cause light sources 34 to illuminate dust cover 32 by a predetermined amount that is determined to be generally sufficient to block out or overpower the specular reflectance of electro-optic element 30 present for a current state thereof. In an embodiment, APCI 50 can be pre-programmed to illuminate light sources 34 at a level that is determined to balance against or correlate with a level of unwanted specular reflectivity exhibited by electro-optic element 30 at a current or selected level according to the various modes discussed above. Again, this can be done by using pre-programmed levels based on baseline estimates, using measured information, or a combination of measured and perceived information. In another embodiment, a user can provide an input to manually control the level of illumination for dust cover 32 so as to adjust a perceived level of specular reflectivity from electro-optic element 30 through dust cover 32, depending on personal preference. In either embodiment, the color of the light from dust cover 32 can be adjusted, for example, to generally match the color of the inner walls of an aircraft cabin. Even further, the intensity of light from dust cover 32 can be adjusted to match a reflective quality (i.e. overall diffuse and specular qualities) of the inner walls when combined with the specular reflectivity of the electro-optic element 30. Such color or quality matching can be implemented when electro-optic element 30 is in a fully darkened state or progressively as it is darkened.

In another application, a color or even a color selection may be one selected by a particular airline and ultimately activated by a user. For example, it is contemplated that the light sources 34 may be configured to emit a light that matches a desired color scheme inside the cabin interior of an aircraft. It is also possible to alter the intensity of the color and light exhibited by the edge lit dust cover assembly 32 by varying the power supplied to the LEDs (or light sources 34). This feature can be a controllable option provided to an airline passenger or controlled by an aircraft computer. This construction is desirable over alternative approaches, such as the use of liquid crystal displays (LCDs) that may exhibit unacceptable levels of haze and which require an alternating current ("AC") power source. The use of light sources such as LEDs may draw comparatively little power such that there is an energy savings within the aircraft, and in addition, by the use of LEDs, excessive amounts of heat can be limited.

In addition, or as an alternative, to matching a color scheme of an aircraft interior, the color, brightness and/or intensity of the light sources 34 within dust cover 32 can be controlled to produce a desired aesthetic effect. Such an effect can include the presentation of various lighting schemes, such as those designed to set a specific mood for the cabin of the aircraft (e.g., calm, alert, etc.), to correspond to certain activities (e.g., takeoff, landing, etc.), or to mimic real world lighting (e.g., sunset, sunrise, time at destination, etc.). Further, such lighting schemes, or even standard ambient lighting, as affected by the illumination of dust cover 32 can also be made to correspond to the different darkness levels provided by the electro-optic element 30 associated therewith. This can be done according to the darkness levels of the electro-optic element 30 individually (such as through an automatic adjustment by, for example APCI 50, controller 48, an aircraft computer, or by a manual adjustment by the occupant of a seat adjacent the particular dust cover 32). Such adjustment can further be done either according to groups of seats or within the cabin as a whole (such as by APCI 50 or another computer onboard the aircraft). Control of color and intensity can be pre-programmed based on predetermined or estimated lighting conditions, including through coordination with other cabin lighting, or can be done based on perceived conditions within the cabin, such as using one or more photosensors 49.

Lighting control using photosensors 49 or the like can be done using direct control in that the intensity of light sources 34 within dust cover 32 (or a group of dust covers 32) can be set according to criteria involving information obtained from photosensors 49. In an example, the intensity of light sources 34 can be adjusted to match the ambient lighting perceived by photosensors 49. In a further embodiment, a feedback loop can be used such that information from photosensor 49 can be monitored as the intensity of light sources 34 are adjusted so that a change in ambient lighting conditions that results from the adjusting intensity of light sources 34 is taken into account. For example, the reduction in intensity of light sources 34 contributes to a reduction in overall ambient lighting, meaning that the use of a feedback loop can help bring the illumination of dust covers 32 into a condition that, over time, matches the overall ambient lighting. Various controls, including proportional integral-derivative ("PID") controllers can be used to implement a feedback loop of this type in a pleasing manner. In another example, photosensor 49 can be used in a feedback loop or the like to cause the light sources 34 within dust cover 32 (or a group of dust covers 32) to compensate for the loss of cabin light due to darkening of one or more electro-optic elements 30.

Such lighting control can be implemented in a manner that combines the above-described automatic control with manual control functionality. For example, one or more of the above-described manual control modes can be used to adjust the cabin lighting based on the illumination of light sources 34 within dust cover 32 (or dust covers 32) according to a baseline level, from which an individual can cause deviation from on a particular dust cover 32 through a manual override control. Still further, the above-described adjustment of the intensity of light sources 34 within dust cover 32 for purposes of reducing the perceived spectral reflectivity from electro-optic element 30 can be combined with the other lighting schemes described herein. For example, the intensity of light sources 34 can be controlled to reduced perceived spectral reflectivity, whereas the color can be controlled according to a mood-lighting scheme. In another example, the intensity of light sources 34 can be set at a minimum level necessary to eliminate a desired level of spectral reflectivity, which can be increased to match a higher level of ambient lighting detected by photosensor 49. Further combinations for other purposes are also possible.

With reference again to FIG. 3, it is contemplated that one or more light transmitting sheets 36, which may be plastic sheets, may be utilized that include light diffusers, such as occlusions 60, therein. The occlusions 60 disperse the light directed into the edge of the light transmitting sheet 36, thereby creating a more uniform appearance. The occlusions 60 may also assist in directing light into the cabin in the directions of arrows 54. The occlusions 60 may be in the form of spheres, cylinders, etc., that are incorporated into the light transmitting sheet 36 and which are dispersed consistently or randomly through the light transmitting sheet 36. When the light sources 34 are deactivated, the light transmitting sheet 36 has a transparent or mostly transparent appearance, but when the light sources 34, which may be LEDs, are activated and the light transmitting sheet 36 becomes edge lit, an opaque, or partially opaque, appearance is viewable. It is contemplated that the light transmitting sheets 36 may be formed from acrylic or a polycarbonate material, as well as other similar materials. In addition, multiple layers of the light transmitting sheets 36 may be used, optionally with different color sheets. It is also contemplated that red, green, and blue light sources could be provided such that the color of the light transmitting sheet 36 can be modified to a multitude of various shades and colors.

In another embodiment, it is also contemplated that the plastic sheets 36 are laminated to the dust cover assembly 32 or the electro-optic element 30. In one embodiment, the light transmissive sheet 36 is formed from an acrylic material provided by Evonik Cyro LLC, of Sanford Me., such as an 8NLD12, 0E011L, and 0E012XL Endlighten acrylics. However, other colored acrylic materials, as well as a variety of plastic materials, can also be utilized. Generally, the dust cover assembly 32 may be clear or colored and may be utilized with a light source that emits almost any wavelength of light. The dust cover assembly 32 may have a thickness of approximately 3.9 mm, similar to the thickness of traditional mechanical dust cover assemblies.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. Indeed, the dust cover assembly disclosed herein may take on a variety of shapes and could be flat, curved, bent, etc. Further, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A window assembly comprising:
a pressure pane;
a bezel proximate a periphery of the pressure pane and defining an inner opening, the bezel including an inner wall with a channel;
an electro-optic element disposed in the inner opening and received in the channel of the inner wall, the electro-optic element operating between a transmissive condition and a dimmed condition, a surface of the electro-optic element exhibiting a first level of spectral reflectivity at least when in the dimmed condition; and
a dust cover assembly proximate the bezel, the dust cover assembly including a light transmitting sheet and a plurality of light sources disposed at edges of the light transmitting sheet and to emit light into the edge of the light transmitting sheet to illuminate a surface of the light transmitting sheet extending between the edges with a diffuse light having a uniform appearance over the surface.

2. The window assembly of claim 1, wherein the plurality of light sources emit light into the light transmitting sheet to illuminate the light transmitting sheet with the diffuse light such that less than 30% of the first level of spectral reflectivity from the surface of the electro-optic element is perceptible through the light transmitting sheet.

3. The window assembly of claim 2, wherein the diffuse light is such that less than 15% of the first level of spectral reflectivity from the surface of the electro-optic element is perceptible through the light transmitting sheet.

4. The window assembly of claim 1, wherein the pressure pane includes an interior surface and an exterior surface, the window assembly further including:
an exterior pressure pane frame having an inner surface, the pressure pane being in abutting contact with the inner surface.

5. The window assembly of claim 1, wherein the light transmitting sheet is of a plastic material having a plurality of occlusions consistently distributed therein and assisting in directing light emitted into the edges of the sheet through the surface of the light transmitting sheet and into an adjacent area to illuminate the surface with the diffuse light having the uniform appearance over the surface.

6. The window assembly of claim 5, wherein the occlusions comprise one of cylinders or spheres incorporated into the light transmitting sheet.

7. The window assembly of claim 1, wherein the plurality of light sources are further configured to transmit light into the light transmitting sheet to illuminate the light transmitting sheet in a predetermined color.

8. The window assembly of claim 7, wherein the predetermined color is selected to generally match an interior sidewall of an aircraft cabin.

9. A window assembly comprising:
an electro-optic element operating between a transmissive condition and a dimmed condition;
a dust cover assembly proximate the electro-optic element and including a light transmitting sheet and a plurality of light sources disposed at edges of the light transmitting sheet to emit light into the edges of the light transmitting sheet to illuminate a surface of the light transmitting sheet extending between the edges with a diffuse light dispersed with a uniform appearance over the surface according to one of: a predetermined color, a predetermined intensity, and a combined predetermined color and intensity; and
a control system coupled with the light sources of the dust cover assembly to control the illumination of the light transmitting sheet.

10. The window assembly of claim 9, further comprising:
an aircraft window pressure pane including an interior surface and an exterior surface;
an exterior pressure pane frame having an inner surface, the pressure pane being in abutting contact with the inner surface; and
a bezel proximate a periphery of the pressure pane and defining an inner opening, the bezel including an inner wall with a channel, the electro-optic element being received within the channel.

11. The window assembly of claim 9, wherein the control system includes a user input coupled therewith to receive a user input related to at least one of the predetermined color, the predetermined intensity, and the predetermined color and intensity.

12. The window assembly of claim 9, further including a photosensor, wherein:
the control system is further coupled with the photosensor; and
the control system implements a feedback loop to control the illumination of the light transmitting sheet according to information received from the photosensor.

13. The window assembly of claim 9, further including a photosensor, wherein:
the control system is further coupled with the photosensor; and
the control system implements a feedback loop to control the illumination of the light transmitting sheet such that the plurality of light sources emit light into the light transmitting sheet to further illuminate the light transmitting sheet with a diffuse light at a level greater than a level of ambient light reflected by a surface of the electro-optic element.

14. The window assembly of claim 9, wherein the predetermined color is selected to generally match an interior sidewall of an aircraft cabin.

15. A method for controlling a perceived level of reflectivity of a window assembly, comprising:
determining a perceivable level of ambient light reflected by a surface of an electro-optic element within the window assembly; and
illuminating a plurality of light sources disposed at edges of a light transmitting sheet adjacent the electro-optic element to cause the light sources to emit light into the edges of the light transmitting sheet, such light being uniformly directed outwardly from the light transmitting sheet toward the cabin to illuminate the light transmitting sheet with a diffuse light at a level greater than the perceivable level of ambient light reflected from the surface of the electro-optic element.

16. The method of claim 15, wherein:
the electro-optic element operates between a transmissive condition and a dimmed condition; and
determining the perceivable level of ambient light reflected includes estimating the perceivable level of ambient light reflected based on a correlation thereof with an operating state of the electro-optic element between the transmissive condition and the dimmed condition.

17. The method of claim 15, wherein determining the perceivable level of ambient light reflected includes receiving a measurement of ambient light from a photosensor.

18. The method of claim 15, further including adjusting the diffuse light using a feedback loop based on ambient light information received from a photosensor.

19. The method of claim 15, further including illuminating the light transmitting sheet according to one of: a predetermined color, a predetermined intensity, and a combined predetermined color and intensity.

20. The method of claim 19, wherein the one of the predetermined color, the predetermined intensity, and the combined predetermined color and intensity are received from a user.

* * * * *